Patented Aug. 18, 1953

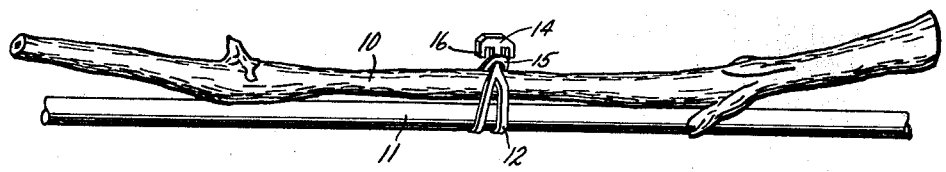
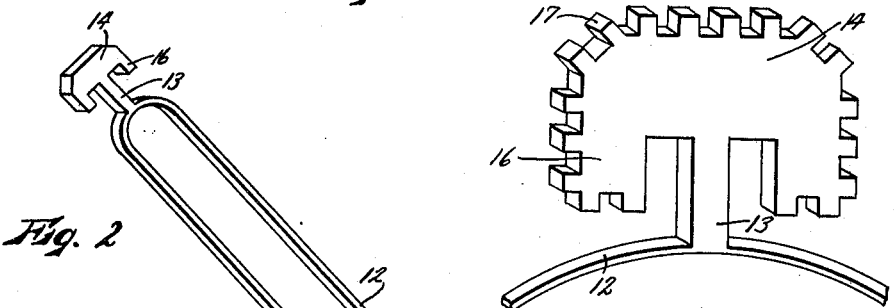

2,648,879

UNITED STATES PATENT OFFICE 2,648,879

TYING AND FASTENING DEVICE

Herman W. Patterson, Overland Park, Kans.

Application July 31, 1950, Serial No. 176,898

2 Claims. (Cl. 24—16)

This invention relates to devices for fastening vines and stems, such as grapes, roses, tomatoes, and beans to wire or other supports. It may also be used for tying bunches of vegetables, such as beets, turnips and carrots, and for tying bundles of small parts in the process of assembling for manufacture or storage, or temporarily holding parts together while glue is setting.

This invention may also be used for "budding"—the transplanting of a bud from one tree to another. It can also be for "bloodless castration," having the advantage of easy application by hand instead of needing a special expensive tool.

It may also be used for other purposes where it would be faster and more economical than to tie with string, wire, or other material, or to use ordinary rubber bands which must be attached by pulling the band over one end of the object instead of at the point of binding such as can be done with my device.

Reference will now be made to the accompanying drawing. This drawing and all description is to be regarded as mainly illustrative and the invention may be embodied in various other similar devices and may be applied to a variety of uses.

The objects and advantages of my invention will be apparent from the following description when taken in conjunction with the accompanying sheet of drawings, in which Figure 1 is a perspective view of a grape vine attached to wire by means of my invention.

Figure 2 is a detached perspective view of the tying and fastening device.

Figure 3 is a perspective view showing another use for my invention in tying bunches of vegetables, such as turnips.

Figure 4 is a fragmentary perspective view of a knob showing serrations along the edge.

This invention is an elastic band of rubber or other suitable material having an enlargement attached to one end. The main body of the said enlargement or knob is extended beyond the periphery of the elastic band and is held in place at the required distance beyond the band periphery by means of a narrower joining member, like a post or neck. The outer ends of the knob are shaped downward to form hooks as an aid to more positive locking. It is simple in form and economical in manufacture or use.

The serrations in the knob allow easier handling and locking of the bands and this is especially helpful when the hands and vegetables are wet. It was found also that the grooves, in that part of the die which formed the above mentioned serrations, were needed to retard the flow of rubber, when extruding this enlargement, and thus prevent scalloping which would occur if there were no grooves.

Different sizes of this tying and fastening device, together with variations in width of bands and thickness of wall, or variations in the neck or knob, will make it applicable to the uses mentioned above and for many other purposes.

When this band is used for fastening a grape vine to a wire, it is wrapped around both vine and wire and the band is fastened by thrusting the knob through the loop formed at the end opposite the knob. The elastic band is then under sufficient tension to draw the loop into a small radius and tightly around the neck between the knob and band. The knob stays in proper position, when under tension, by reason of the pressure and friction of the loop underneath it. The hooks on the knob are for additional safeguard against twisting which would allow the knob to be pulled out of the loop. Any increase in tension reduces both the size of the neck and the radius of the loop, thus creating a firmer lock.

As shown in Figure 1, a grape vine 10 may be attached to a wire 11 by means of my novel fastening device 12. The fastener may be made in larger sizes to accommodate the attachment of vines to supports that are larger than wire. The band, being elastic, will not cut into the vine as happens when using string. The rubber will deteriorate and offer no resistance to removal of the vines for trimming at the end of the season.

In Figure 2, my device is shown in its approximate normal shape before using. The knob 14 is at one end for easy handling and this relative shape and position of knob can be controlled in the process of manufacture.

Figures 1 and 2 show the loop 15 on band 12. In Figure 3 the loop is behind the neck 13 and the knob 14, and does not show in the drawing. Figures 1, 2, 3, and 4 show hooks 16 and Figure 4 shows serrations 17.

From the foregoing description and the accompanying drawing it will now be readily seen that I have provided a novel tying and fastening device which can be economically manufactured and which is very useful in the horticultural, livestock and manufacturing industries.

While I have illustrated and described my novel tying and fastening device, it should be understood that I do not wish to be limited to the arrangements and details of construction herein disclosed, but regard my invention as including such changes and modifications as do not constitute a departure from the spirit and scope of the invention.

Having thus described my invention, I claim:

1. A tying and fastening device comprising an endless band of elastic material, and a knob of the elastic material disposed at a position outward and beyond the periphery of said band, and a thin neck of the elastic material connecting the band and the knob, said knob extending in both directions from said neck and having a lug fixed at each end and extending toward the band.

2. A tying and fastening device comprising an endless band of elastic material, and a knob of the elastic material disposed outwardly from the periphery of said band, and a thin neck of the elastic material connecting the band and the knob, the said knob having a lug fixed at each end and extending downward toward the band in such a manner as to form hooks at each end of the knob.

HERMAN W. PATTERSON.

References Cited in the file of this patent

UNITED STATES PATENTS

| Number | Name | Date |
|---|---|---|
| 1,062,643 | Fox | May 27, 1913 |
| 1,282,468 | Scheel | Oct. 22, 1918 |
| 1,797,539 | Arthur | Mar. 24, 1931 |
| 1,945,932 | Caley | Feb. 6, 1934 |
| 2,004,702 | Luttmann, Jr. | June 11, 1935 |
| 2,226,409 | Patterson et al. | Dec. 24, 1940 |

FOREIGN PATENTS

| Number | Country | Date |
|---|---|---|
| 13,946 | Great Britain | of 1899 |